INVENTOR.
ARTHUR C. ROBERTO
BY
R.E. Geangue
ATTORNEY

*INVENTOR.*
ARTHUR C. ROBERTO
BY
*ATTORNEY*

United States Patent Office 3,135,361
Patented June 2, 1964

3,135,361
INTERNALLY EXPANDING BRAKES
Arthur C. Roberto, 17033 Rinaldi St.,
Granada Hills, Calif.
Filed Mar. 2, 1961, Ser. No. 92,932
3 Claims. (Cl. 188—78)

This invention relates to brakes and more particularly to an internal, expanding, hydraulically operated brake suitable for use on various types of vehicles, and it consists of a construction arrangement as herein described and claimed.

In the past, it has been conventional practice to employ brake shoes which are usually formed as levers, each pivoted at one end to a stationary plate. The opposite ends of the shoes are moved outwardly by a cam or hydraulic action against adjacent portions of the brake drum. In this conventional arrangement, owing to the converging relationship between the shoes and the adjacent part of the brake drum when the brake is off, the pressure exerted by the brake lining on the brake drum is not uniform over the entire length of the brake lining. Also, owing to the position of the pivot of each brake shoe about which the lever is moved, such pressure does not act radially in relation to the interior surface of the brake drum periphery. Thus, with the brakes generally used, it is impossible to obtain 100 percent braking of the power of the shoe lining. Furthermore, most conventional braking apparatus fail to provide a positive means for maintaining the brake shoes in their expanded position during a braking operation, so that upon engagement of the brake lining with the brake drums, the tendency of the brake shoes to move inwardly must be overcome.

Other difficulties I encountered when employing such conventional brakes among which are that these brakes cannot employ more than approximately a 220 circumferential degree of brake lining, do not wear the lining to good advantage, tend to deflect the brake drum out of shape during heavy applications, and impose an unbalancing load on the wheel bearings during such application.

Therefore, it is an object of the present invention to provide a brake apparatus which makes possible the use of a maximum circumferential expense of brake lining, which provides highly desirable wearing characteristics, which produces uniform expansion stresses in the brake drum to minimize drum deflection, and which balances radial loads against the drum so as not to impose additional bearing loads on the wheel bearings.

It is another object of the present invention to provide means for counteracting any tendency of the brake shoe to move inwardly when the lining does not engage with the brake drum so that the lining of all shoes is maintained in circumferential alignment when the brake is not engaged.

It is another object of the present invention to provide means for balancing the braking movement imparted to the individual brake shoes.

Still a further object of the invention is to provide a brake of simple and sturdy construction which is suitable for use with a variety of types of motor vehicles.

With the foregoing and other objects in view, the brake of the present invention is further described in the following detailed specification and illustrated in the accompanying drawings forming a part of this application, and in which.

Figure 1:
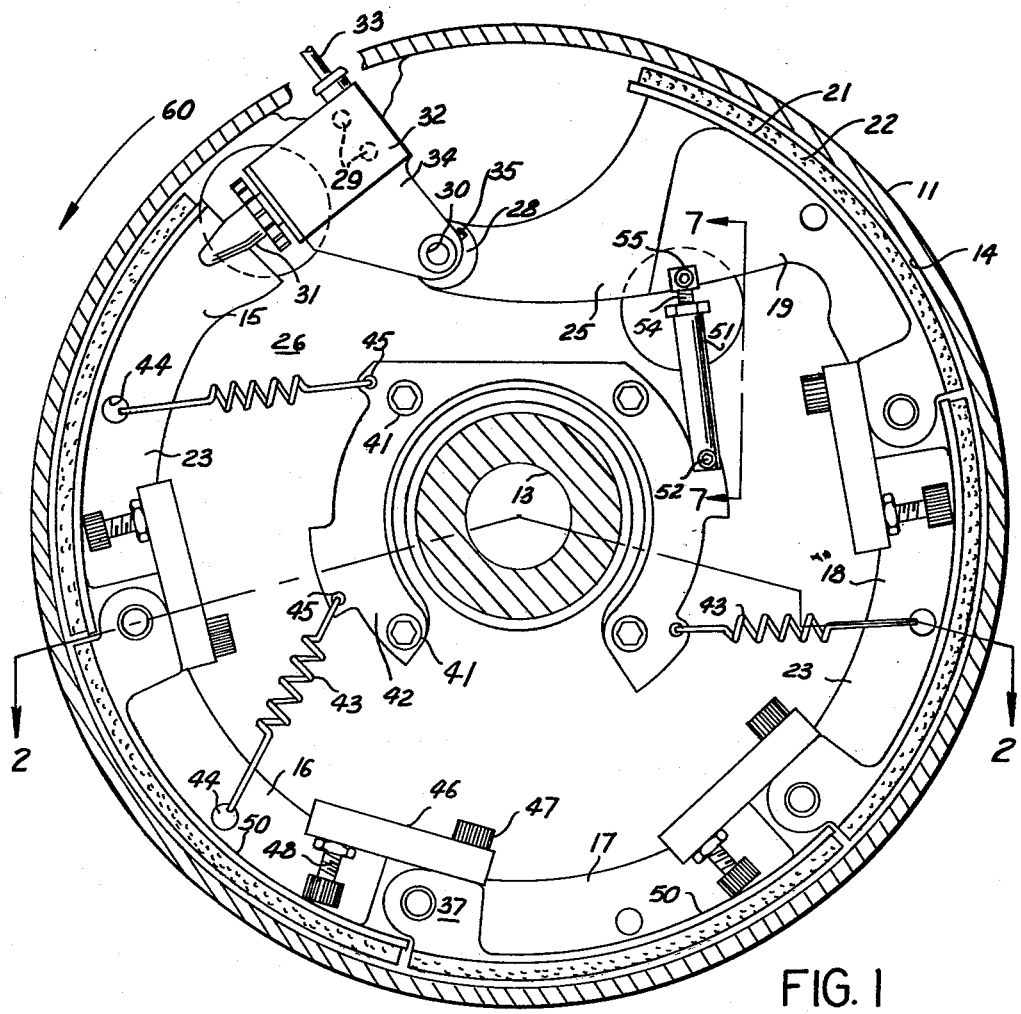
FIGURE 1 is a vertical sectional view taken in the direction of arrows 1—1 of FIGURE 2 of the brake apparatus of the present invention showing the brake shoes in side elevation.
Figure 2:
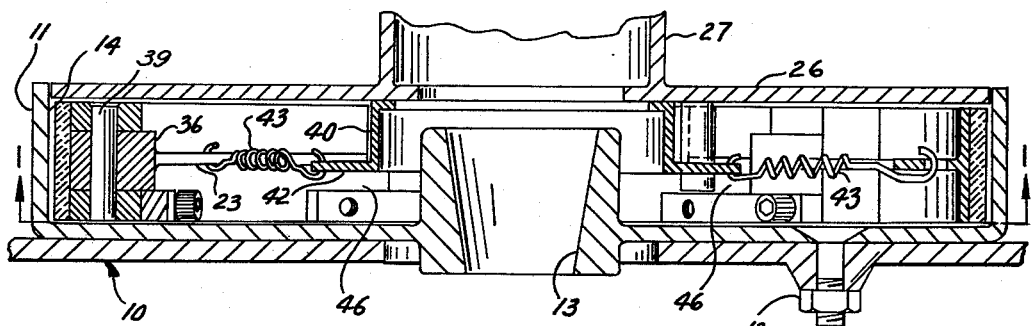
FIGURE 2 is a sectional plan view of the brake apparatus of FIGURE 1 taken in the direction of arrows 2—2.

In the drawings, in which like numbers of reference denotes similar parts, the numeral 110 generally designates the wheel plate conventionally incorporated in a road wheel of a motor vehicle. Associated with the wheel plate is a rotatable drum 11 which is secured to the plate by means of a plurality of bolt and nut arrangements such as arrangement 12. The drum is provided with a tapered receptacle 13 which is adapted to receive the extended end of an axle (not shown) whose powered rotation is translated into rotation of the wheel. The drum further provides an internal annular frictional surface 14 for engagement with a series of brake shoes, which are of the expanding type.

In the present invention, it is preferable to employ a complement of brake shoes 15–19 inclusive which substantially compose a circle within the brake drum. As is evident from the drawings, each shoe is constructed in the form of an arc of a circle with an outer face 21 having a brake lining 22 secured thereto in a suitable manner. The lining conforms to the curvature of the drum and its surface is adapted to engage the frictional surface 14 of the drum 11 for braking the motion of the wheel. Each shoe is reinforced by a suitable web 23 which produces a brake shoe configuration that is T-shaped in cross section.

Brake shoes 16, 17 and 18 are identical in construction. However, shoe 19 is provided with a flange 25 integrally formed with web 23 which extends inwardly from the circumference of the drum and which is anchored to the yoke 34 of a cylinder 32. The mounting arrangement for flange 25 of brake shoe 19 comprises a bearing surface 28 which is pivotally mounted on an anchor pin 30 which is suitably carried by a yoked flange 34 secured to a cylinder 32. Screw 35 holds the pin in place. In this manner, shoe 19 may pivot about anchor 30.

Brake shoe 15 is mounted on one end to a push rod 31 of the hydraulic cylinder 32. Fluid for actuating the push rod 31 is provided to cylinder 32 by means of a hydraulic line and fitting 33. Cylinder 32 is fixed to the stationary backing plate 26 by a pair of screws 29 so that when hydraulic fluid is introduced into the cylinder, push rod 31 will advance from the cylinder.

Figure 3:
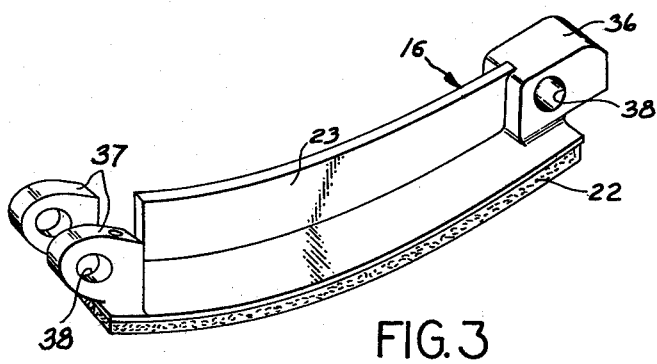
FIGURE 3 is a perspective view of a typical brake shoe employed in the brake apparatus in FIGURE 1.

A complement of brake shoes composing a circle within the brake drum is pivotally joined in an end-to-end relationship by means of a hinge mechanism joining the opposing ends of adjacent brake shoes which permit pivotal movement between each of the brake shoes. To provide this hinge arrangement as shown more clearly in FIGURE 3, each shoe is provided with a tongue 36 on one of its ends and a yoke 37 on its other end. Each tongue and yoke is provided with an annular aperture 38 so that when the tongue on one end of a brake shoe is interposed in the yoke on the end of an adjacent and opposing brake shoe, the apertures are in alignment so as to receive a pin 39 which joins the adjacent brake shoes.

Figure 4:
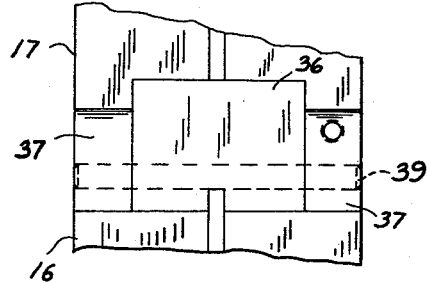
FIGURE 4 is a plan view of the pivotal means connecting adjacent brake shoes.

FIGURE 4 is an enlarged view of one hinge arrangement which connects the adjacent ends of brake shoes 16 and 17, for example.

Coaxial with the axle and axle housing 27, there is provided a substantially U-shaped spring retention collar 40 which is suitably attached to the stationary plate 26 by means of bolts 41. This collar is provided with an outward extending flange 42 which is in alignment with the web 23 of each of the brake shoes. Each shoe is connected to flange 42 of collar 40 by means of a retention spring 43 which has its opposite end clipped through apertures 44 provided in the brake shoe web and apertures 45 provided in flange 42, respectively. However, it is to be noted that shoes 17 and 19 are not provided with such a retention spring. The purpose of the retention springs is to position the individual shoes to their respective neutral position as shown in FIGURE 1 from their expanded or braking position. Brake shoes 17 and 19 do not require such a retention spring since the springs associated with shoes 15, 16 and 18 are sufficient to assist in positioning shoes 17 and 19 to their neutral position. The tension springs serve to return and retain the shoes in proper space relationship with respect to the brake drum when the applied hydraulic force to cylinder 32 is released.

Figures 5, 6:
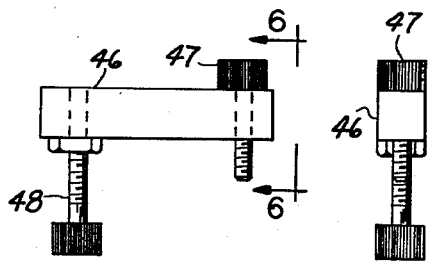
FIGURE 5 is a side elevational view of the adjustable shoe retaining arm means for restricting excess brake shoe inward movement while brake is in neutral position.
FIGURE 6 is an end view taken in the direction of arrows 6—6 of FIGURE 5.

In order to restrict any undesirable inward displacement of the brake shoes while brake is in neutral position, means are employed for limiting the inward movement of each shoe which comprises, a bar or arm 46 associated with each shoe which is attached to a portion of a shoe yoke by means of a securing screw 47. Each bar is secured to the yoke so that its free end is cantilevered past the end of the shoe on which it is mounted and terminated well over the end of an adjacent and opposing shoe. The free end of bar 46 is provided with an adjustable screw 48 which is interposed between the bar 46 and an inner face 50 of the brake shoe. The head of screw 48 is arranged to engage with the inner face 50 at the conclusion of a braking operation as shown in FIGURE 1. Bar 46 and its associated screws are shown more clearly in FIGURES 5 and 6 and may be pre-set to permit any desired amount of clearance between the shoe lining braking surface and the drum braking surface.

Figure 7:
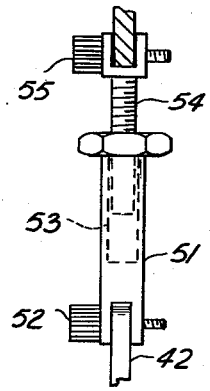
FIGURE 7 is a side view, partially in section of an anchor retaining means cooperating with the retaining arm means of FIGURES 5 and 6 for preventing excess inward travel of the shoes when brake is in neutral position.

Brake shoe 19 is coupled to flange 42 of the retaining collar by means of an adjustable anchor arrangement which is more clearly shown in FIGURE 7. The anchor arrangement comprises a receptacle member 51 which is secured to flange 42 by means of a retaining screw 52. Receptacle 51 is provided with a bore 53 which receives a threaded shank 54 carried by a screw member which is secured to shoe 19 by means of a retaining screw 55. Inasmuch as the anchor means couples shoe 19 to the flange 42, it can be seen that upon the extension of rod 31 from housing 32, the complement of brake shoes are prevented from excessive inward radial movement. The screw members or elements 48 are employed to restrict any tendency of the complement of shoes to move inwardly. This prevents the lapse or any inwardly directed movement of any brake shoes when contact is made between the lining 22 and the braking surface 14 of the brake drum as well as limiting and restricting the inward displacement of the complement of shoes at the completion of the braking operation. The anchor arrangement may be adjusted in length to provide a desired spaced relationship between the shoe 19 and the flange 42. For adjustment, shank 54 may be rotated out of or into receptacle 51 to lengthen or shorten the anchor arrangement. The effect results in bringing the lining either closer to or further away from the braking surface 14 of the drum. Such an adjustment can be employed for compensating wear of the lining on the brake shoes, for example.

In operation, when the brake pedal is applied, the usual hydraulic fluid is supplied to cylinder 32 which acts upon piston rod 31 to move outwardly since cylinder 32 is fixed to the backing plate. The piston will, in turn, act upon the end of brake shoe 15 to move the lining 22 of the shoe into frictional engagement with facing 14 of the brake drum. This movement is translated via the hinge arrangement to shoes 16, 17, 18 and 19 so that these shoes simultaneously cause their linings to engage surface 14 as well as the lining on shoe 15. Inasmuch as flange 25 of shoe 19 is pivotally secured to the yoked flange 34 of cylinder 32, the complement of brake shoes will expand outwardly simultaneously upon the advancement of piston 31 from cylinder 32 so that maximum stopping power is provided by all of the brake shoes. Thereby, the effect is created of having one large frontal shoe. Since the drum is rotating in a counter-clockwise direction as indicated by arrow 60, the friction on the linings will cause the shoe sections to move outwardly in addition to the advancement of push rod 31. As each shoe moves inwardly at the completion of a braking operation due to the tension of the springs, each shoe associated screw member 48 is moved into contact with an adjacent shoe against inner surface 50 via its mounting arm or bar 46 so that inward movement is restricted. The limit of inward displacement may be selected by adjustment of the screws. The tension on the various springs will be chosen to obtain uniform wear of the lining.

With the exception of the portion of brake drum frictional surface 14 between the adjacent ends of shoes 15 and 19, the brake lining will contact almost 360 degrees of the drum frictional surface 14 and there will be equal gripping or braking pressure at all contact points. From the preceding description, it will be manifest that this construction provides a simple and practical mechanism of a reliable and serviceable nature. Furthermore, the pressure of the brake shoes is evenly distributed over the entire brake surface in a true radial direction and the part may be assembled or disassembled with relative ease.

Having described only a typical form of the invention, I do not wish to be limited to the specific details herein set forth, but wish to reserve to myself any variations or modifications that may appear to those skilled in the art and fall within the scope of the following claims.

What is claimed is:

1. An expansion brake comprising, an annular stationary plate adaptable to fit within the confines of a cylindrical brake drum, an annular array of brake shoes spaced apart from the plate having a first and a last shoe, the last shoe having radially inwardly extending flange pivotally anchored to the plate, a hydraulic actuating means fixed to the plate at a point spaced from the flange of the shoe, said means having a movable piston connected to the first shoe, hinge means pivotally connecting the ends of adjacent shoes of the array in an end-to-end relationship, the brake shoes being simultaneously radially moved by the piston of the actuating means to expand into contact with the drum, a collar co-axial with and secured to the plate and having a radially outwardly extending flange in the same plane with the flange of the last shoe, tension biasing means resiliently connecting each shoe of the array to the flange of the collar urging the shoes radially inwardly against the movement of the piston, and means carried on each shoe including an arm projecting across an adjacent shoe and into contact therewith for limiting the inward movement of the shoes at the completion of a braking operation.

2. The invention as defined in claim 1 wherein said means for restricting inward movement of the shoes includes an adjustable link connecting the flange of the last shoe to the collar and wherein the means carried on each shoe includes an adjustable screw selectively engageable with an adjacent shoe to permit predetermined inward movement of the shoe.

3. An expansion brake comprising, an annular stationary plate adaptable to fit in a cylindrical brake drum, at least five brake shoes lying in an annular array spaced from the plate, the shoes arranged in an end-to-end fashion to in effect provide a uniform frontal area selectively engageable with the drum, hinge means connecting the ends of adjacent shoes for pivotal movement respective to each other, hydraulic piston and cylinder assemblage carried by the plate wherein the cylinder is secured to the plate and the piston selectively advances and retracts, the first shoe of the array connected to the piston and movable therewith, the last shoe of the array pivotally connected to the plate at a point substantially radially inward and remote from said assemblage and responsive to pivot upon advancement of the piston via the other shoes, the brake shoes being radially moved in unison outward by the advancement of the piston to expand into contact with the drum, a collar co-axial with the plate having a radially outwardly extending flange, a tension spring resiliently connecting each shoe to the flange urging the shoes radially inward against the applied force of piston advancement, and an arm carried by each shoe projecting behind an adjacent shoe, and an adjustable screw carried on the projecting end of each arm so arranged as to engage said adjacent shoe and restrict inward movement of the shoes while in a neutral position.

References Cited in the file of this patent

UNITED STATES PATENTS

| | | |
|---|---|---|
| 2,006,448 | Frank | July 2, 1935 |
| 2,192,293 | Waseige | Mar. 5, 1940 |
| 2,723,016 | Goldberg | Nov. 8, 1955 |

FOREIGN PATENTS

| | | |
|---|---|---|
| 439,902 | Germany | Jan. 22, 1927 |